Patented June 26, 1945

2,378,990

UNITED STATES PATENT OFFICE 2,378,990

PROCESS FOR THE RECOVERY OF RUBBER LATICES FROM PLANTS

Tirey Foster Ford, Arlington, Va.

No Drawing. Application August 17, 1943,
Serial No. 499,033

8 Claims. (Cl. 47—10)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the extraction of rubber latices for later coagulation from such plants as the common milkweed, dogbane, lettuce, cryptostegia, poinsettia, and from any such plants which exude latex from incisions.

The invention has among its objects a process for the recovery of the latex, in a form relatively free from contaminants; a process which effects recovery with little loss of the latex; a process which avoids deterioration of the latex; and a process which is simple and economical.

In prior art processes the plants are dried and ground in aqueous dispersion medium. This results in serious contamination with coloring matter and with the plant tissues, and, in removing the contaminants by such processes as settling, filtering, and centrifuging, large losses of the rubber result. By drying, with all rubber-containing plants, a certain proportion of the rubber becomes fixed to the woody tissues. Thus it is lost mechanically in separation processes involving grinding and flotation, for example.

I have found that the removal of latex can be quite readily accomplished with all those plants which exude latex from incisions by harvesting the plants when green and by properly cutting the harvested fresh plants into small sections and quickly washing the uncoagulated latex from the cuttings with water containing a little acid or acidic substance or alkali or alkaline substance, depending upon the particular plant used. With the common milkweed, dilute hydrochloric acid readily disperses the exuded latex.

I have obtained good results by cutting the green plants across leaves and stems, producing sections from 1/8 to 1/2 inch long, the cuts being made at time intervals of 10 to 20 seconds. The time intervals between making of cuts should be sufficient to allow droplets of latex to exude from the cut surfaces of the plants. The cuttings should be washed at once, and should be in contact with the dispersing liquid for as short a time as possible to avoid contamination of the latex with green coloring matter and other unwanted substances.

For dispersing the latex of the common milkweed, dilute sulfuric acid and dilute orthophosphoric acid as well as dilute hydrochloric acid are satisfactory dispersing liquids. Concentrations of from 1/2 percent to 2 percent of the commercial strength acids in water give good results, although with each of these acids higher concentrations may be used, a 5 percent concentration, for example, being permissible. Higher concentrations are not desirable, however, because high concentration of chemicals in the washing liquid, like long contact between the liquid and the cuttings, tends to cause increased contamination of the latex. With milkweeds, I have found that alkaline reacting substances, such as ammonia, sodium hydroxide, and tri-sodium phosphate may also be used, although they are less satisfactory than acids for this plant.

With other plants, I have found that alkaline reacting substances, such as dilute ammonia, dilute sodium hydroxide, or dilute soap solutions should preferably be used as the dispersing liquids. The most effective concentrations of these alkalis are from 1/2 percent to 2 percent, as with acids.

Experimental yields of rubber obtained from milkweed by the process described, using dilute acid wash solutions, were at the rate of 100 to 300 lbs. per acre.

Many substances not specifically mentioned here might be used as dispersing agents. Acid reacting salts, such as sodium acid sulfite, for example, might be used. Water alone can be employed to wash the latex off cuttings provided the washing is vigorous, but neutral reacting water has little or no dispersing effect.

Having thus described the invention, what is claimed is:

1. The process of recovering rubber latex from plants which exude latices when cut comprising the steps of harvesting the plants when green, of repeatedly cutting across the harvested, fresh, green plants at regulated time intervals of such length of time that droplets of latex exude from the cut surfaces of the plants, thus producing small sections of the plants from which the latex has exuded, and of washing the latex from said cuttings in an aqueous medium in which the latex will be dispersed.

2. The process of recovering rubber latex from plants which exude latices when cut which are stable in acid media comprising the steps of harvesting the plants when green, of repeatedly cutting across the harvested, fresh, green plants at regulated time intervals of such length of time that droplets of latex exude from the cut surfaces of the plants thus producing small sections of the plants from which the latex has exuded, and of washing the latex from said cuttings in a dilute aqueous acidic reacting solution.

3. The process of recovering rubber latex from plants which exude latices when cut which are stable in acid media comprising the steps of harvesting the plants when green, of repeatedly cutting across the harvested, fresh, green plants at regulated time intervals of such length of time that droplets of latex exude from the cut surfaces of the plants, thus producing small sections of the plants from which the latex has exuded, and of washing the latex from said cuttings in a dilute aqueous solution of from ½ percent to 5 percent of an acid selected from the group consisting of hydrochloric, sulfuric, and phosphoric.

4. A process of recovering rubber latices from plants which exude latices when cut which are stable in alkaline media comprising the steps of harvesting the plants when green, of repeatedly cutting across the harvested, fresh, green plants at regulated time intervals of such length of time that droplets of latex exude from the cut surfaces of the plants, thus producing small sections of the plants from which the latex has exuded, and of washing the latex from said cuttings in a dilute aqueous alkaline reacting solution.

5. The process of recovering rubber latex from plants which exude latices when cut which are stable in dilute aqueous ammonia comprising the steps of harvesting the plants when green, of repeatedly cutting across the harvested, fresh, green plants at regulated time intervals of such length of time that droplets of latex exude from the cut surfaces of the plants, thus producing small sections of the plants from which the latex has exuded, and of washing the latex from said cuttings in ammonia solution containing approximately from ½ percent to 2 percent of commercial aqueous ammonia.

6. The process of recovering rubber latex from plants which exude latices when cut comprising the steps of harvesting the plants when green, of repeatedly cutting across the harvested, fresh, green plants at regulated time intervals of such length of time that droplets of latex exude from the cut surfaces of the plants, thus producing small sections of the plants from which latex has exuded, and of washing the latex from said cuttings in a dilute aqueous soap solution.

7. The process of recovering rubber latex from plants which exude latices when cut comprising the steps of harvesting the plants when green, of repeatedly cutting across the harvested, fresh, green plants at regulated time intervals of such length of time that droplets of latex exude from the cut surfaces of the plants, thus producing small sections of the plants from which the latex has exuded, and of washing at once the uncoagulated latex from said cuttings in an aqueous medium in which the latex will be dispersed.

8. The process of recovering rubber latex from plants which exude latices when cut comprising the steps of harvesting the plants when green, of repeatedly cutting across the harvested, fresh, green plants at regulated time intervals about from 10 seconds to 20 seconds to produce sections of the plants about from $\frac{1}{16}$ to ½ inch long, thus producing sections from which the latex has exuded, and of washing the latex from said sections in an aqueous medium in which the latex will be dispersed.

TIREY FOSTER FORD.